E. CLARK.
VEHICLE SPRING.
APPLICATION FILED APR. 26, 1919.
1,338,854.
Patented May 4, 1920.
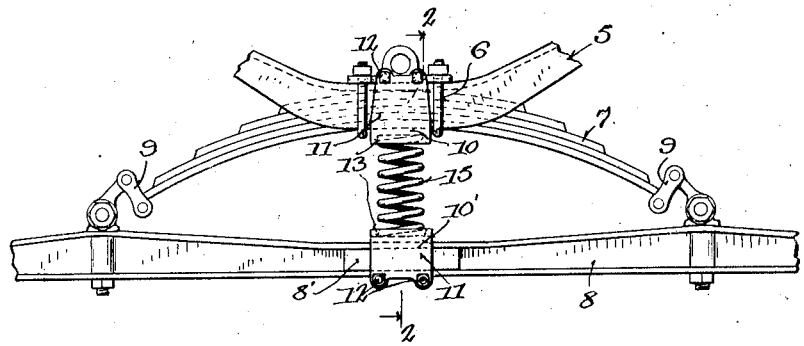
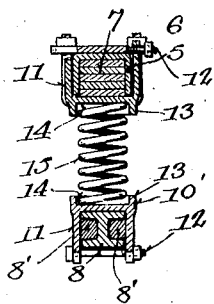
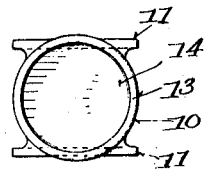
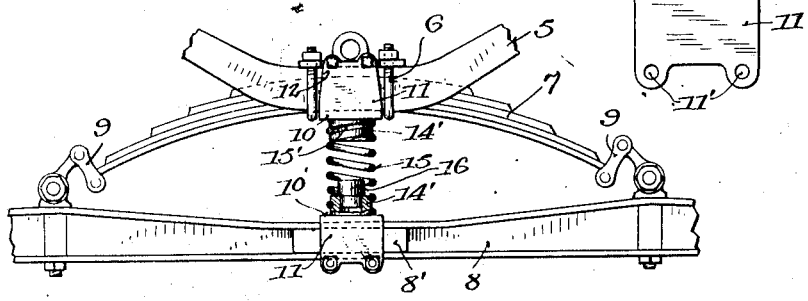
Inventor
Edward Clark
By Morsell & Keeney
Attorneys.

UNITED STATES PATENT OFFICE.

EDWARD CLARK, OF MILWAUKEE, WISCONSIN.

VEHICLE-SPRING.

1,338,854.  Specification of Letters Patent.  Patented May 4, 1920.

Application filed April 26, 1919. Serial No. 292,844.

*To all whom it may concern:*

Be it known that I, EDWARD CLARK, a citizen of the United States, and resident of Milwaukee, in the county of Milwaukee and State of Wisconsin, have invented new and useful Improvements in Vehicle-Springs, of which the following is a description, reference being had to the accompanying drawings, which are a part of this specification.

The present invention relates to certain new and useful improvements in automobiles and refers more particularly to means for reinforcing the spring structures employed in machines of the Ford type.

This invention has for its primary object to provide a reinforcing means for spring structures which will also serve as a shock absorber and which will be readily attachable to machines now in use.

A further object of this invention is to provide a reinforcing means for spring structures of the type stated which will be simple in construction and efficient in operation.

With the above and other objects in view, which will appear as the description proceeds, my invention resides in the novel construction, combination and arrangement of parts substantially as hereinafter described and particularly defined by the appended claim, it being understood that such changes in the precise embodiment of the herein disclosed invention may be made as come within the scope of the claim.

In the accompanying drawing, I have illustrated one complete example of the physical embodiment of my invention constructed according to the best mode I have so far devised for the practical application of the principles thereof, in which:

Figure 1 is a plan view of a portion of a chassis frame and axle with my invention attached thereto;

Fig. 2 is a sectional view taken through Fig. 1 on the line 2—2;

Fig. 3 is a detail view of one of the bracket members retaining the extensible spring in position;

Fig. 4 is a view similar to Fig. 1 illustrating a modified form of means for securing the spring to the bracket, and Fig. 5 is a sectional view through a bracket member similar to that depicted in Figs. 1, 2 and 3, illustrating the novel spring securing means employed therewith.

Referring now more particularly to the drawing, 5 designates a portion of an automobile chassis frame secured to which, by means of clips 6, is a leaf spring 7 having its ends pivotally secured to an axle 8 by shackle members 9, all of which is of the type used in Ford cars. In the structure just described, the springs 7 and the axle 8 often break when the wheels of the vehicle strike some unevenness in the road, and my invention is designed to reinforce the spring and axle at its weakest point and at the same time provide a shock absorbing means therefor.

My invention comprises a pair of bracket members 10—10' formed with depending arms or flanges 11, the brackets being substantially U-shaped in cross section and engaging the axle or frame as best shown in Fig. 2. The transverse portions of the brackets have formed thereon an annular upstanding flange 13 providing a socket 14 for receiving the adjacent end of an extensible spring 15 and thereby confining the spring between the spring and axle.

The bracket member 10 which engages the spring and chassis frame, has one flange 11 thereof extended beyond the end of the other flange 11 and is provided with a threaded opening adapted to receive set screws or other fastening means 12 which engage the top portion of the chassis frame 5 to retain the bracket member 10 in position as best shown in Fig. 2. The flanges 11 of bracket member 10' extend below the axle 8 and have formed therein perforated projecting ears 11' adapted to receive bolts 12 for securing the same to the axle. As best shown in Fig. 2, a supporting bar 8' is inserted in the channel in each side of the axle 8 and thus substantially reinforces the axle where the strain is applied thereto by means of my device.

The spring 15 exerts a pressure against leaf spring 7 and axle 8, thus relieving a portion of the strain applied to spring 7, reinforcing the same at its intermediate portion, and should a severe blow be given the same by the wheels (not shown) striking a rough place in the road, the spring 15 will function as a shock absorber as well as reinforcing the structure described.

In the form of my invention depicted in Fig. 5, the socket 14 has its interior wall grooved as at 13' to receive the spirals of the spring, and thus secure it in the socket against dislodgment.

In the form of my invention depicted in Fig. 4, the socket member 14' has its exterior wall spirally grooved as at 15' to receive the end of spring 15, as will be readily understood, and in the central bore, of the lowermost bracket 10' is inserted a resilient bumper 16 for preventing the meeting of the two sockets 14', should a severe blow be given the axle.

From the foregoing description taken in connection with the drawing, it will be readily understood that the spring 15 is in threaded connection with the brackets 10—10', and thus the accidental dislodgment of the spring from its bracket members is prevented, and it will be obvious that I provide a simple, efficient and inexpensive device.

What I claim as my invention is:

The combination with an automobile comprising a frame, an I-beam supporting axle and a leaf spring supporting the frame from the axle, of an upper bracket member secured to the frame and spring and including a U-shaped member engaged about the frame where the leaf spring is secured thereto and set screw members carried by said bracket and engaged against the vehicle frame to secure said bracket thereto, a lower bracket member including an inverted U-shaped bracket engaged with the supporting axle in vertical alinement with the upper bracket, and securing bolts retaining the lower bracket upon the axle, reinforcing inserts set in the channels of the supporting axle where the lower bracket is secured thereto, and an extensile spring secured between the upper and lower bracket members and urging the same apart.

In testimony whereof I affix my signature.

EDWARD CLARK.